(12) United States Patent
Takao (10) Patent No.: US 9,979,210 B2
(45) Date of Patent: May 22, 2018

(54) EQUALIZING APPARATUS (71) Applicant: Panasonic Intellectual Property Management Co., Ltd., Osaka (JP)

(72) Inventor: Hiroshi Takao, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 13 days.

(21) Appl. No.: 14/912,377

(22) PCT Filed: Sep. 26, 2014

(86) PCT No.: PCT/JP2014/004930
§ 371 (c)(1),
(2) Date: Feb. 16, 2016

(87) PCT Pub. No.: WO2015/072061
PCT Pub. Date: May 21, 2015

(65) Prior Publication Data
US 2016/0218525 A1 Jul. 28, 2016

(30) Foreign Application Priority Data
Nov. 13, 2013 (JP) .................................. 2013-234695

(51) Int. Cl.
*H02J 7/00* (2006.01)
(52) U.S. Cl.
CPC .......... *H02J 7/0014* (2013.01); *H02J 7/0016* (2013.01); *H02J 7/0021* (2013.01); *Y02T 10/7055* (2013.01)
(58) Field of Classification Search
CPC .......... G01R 31/3658; H01M 10/4257; H01M 2220/20; H01M 10/4207;
(Continued)

(56) References Cited

U.S. PATENT DOCUMENTS

2010/0019725 A1    1/2010  Nakatsuji
2012/0038321 A1*   2/2012  Cheng ................... H01M 10/42
                                                                320/116
(Continued)

FOREIGN PATENT DOCUMENTS

CN         101563827 A       10/2009
JP         2009-038876        2/2009
(Continued)

OTHER PUBLICATIONS

International Search Report of PCT application No. PCT/JP2014/004930 dated Dec. 22, 2014.
(Continued)

*Primary Examiner* — Binh Tat
(74) *Attorney, Agent, or Firm* — McDermott Will & Emery LLP (57) ABSTRACT

Battery controller chooses as a standard storage battery Bs one of the storage batteries which has the lowest voltage in storage batteries B1 to Bn. Battery controller obtains as a standard voltage Vs a voltage of the standard storage battery Bs, and obtains as a standard SOHs an SOH of the standard storage battery Bs. Battery controller specifies from storage batteries B1 to Bn a storage battery to be discharged by equalizing unit 450 based on a magnitude relation between an SOHj of each of the storage batteries and the standard SOHs and based on a voltage difference between the terminal voltage of each of the storage batteries and the standard voltage Vs. Battery controller performs an equalizing process by causing equalizing unit to discharge the specified storage battery.

8 Claims, 4 Drawing Sheets

(58) Field of Classification Search
CPC ..... H01M 2010/4271; H01M 2220/30; H01M 10/482; H01M 10/441; H02J 7/0003; H02J 7/0004; H02J 7/0011; H02J 9/061; H02J 7/0016; H02J 7/0068; H02J 7/02; H02J 7/0014; Y02T 10/7055; Y02T 10/7005; Y02T 90/14; Y02T 10/725; Y02T 10/7011; Y02T 10/7088; Y02T 10/7061; Y02T 10/7066; Y02T 10/7077; Y02T 10/7241
USPC .................................................. 320/116–123
See application file for complete search history.

(56) References Cited

U.S. PATENT DOCUMENTS

2012/0268057 A1* 10/2012 Wu ...................... H01M 10/44 320/103
2013/0002203 A1 1/2013 Kuraishi
2014/0042973 A1* 2/2014 Kawahara ........... H01M 10/441 320/118
2014/0346775 A1 11/2014 Takeo

FOREIGN PATENT DOCUMENTS

| | | |
|---|---|---|
| JP | 2011-061955 | 3/2011 |
| JP | 2012-257392 | 12/2012 |
| JP | 2013-013268 | 1/2013 |
| WO | 2013/121916 | 8/2013 |

OTHER PUBLICATIONS

The English Translation of Chinese Search Report dated Dec. 26, 2017 for the related Chinese Patent Application No. 201480061019.5.

* cited by examiner

EQUALIZING APPARATUS

CROSS-REFERENCE TO RELATED APPLICATIONS

This application is a U.S. national stage application of the PCT International Application No. PCT/JP2014/004930 filed on Sep. 26, 2014, which claims the benefit of foreign priority of Japanese patent application 2013-234695 filed on Nov. 13, 2013, the contents all of which are incorporated herein by reference.

TECHNICAL FIELD

The present invention relates to an equalizing apparatus for an assembled battery.

BACKGROUND ART

A storage battery system is known which is equipped with an equalizing apparatus which uniformly adjusts a variation of terminal voltage between storage batteries in an assembled battery made up of a plurality of series connected storage batteries. In the conventional method, the terminal voltages of the storage batteries are detected, and each of the storage batteries is discharged if the voltage difference between the terminal voltage of the storage battery and the minimum terminal voltage is equal to or greater than a threshold value; thus, the variation of terminal voltage between the storage batteries is controlled (see PTL 1 below).

CITATION LIST

Patent Literature

PTL 1: Unexamined Japanese Patent Publication No. 2009-38876

SUMMARY OF THE INVENTION

By the above method, the variation of terminal voltage between the storage batteries may be adjusted. However, deterioration states of the storage batteries are not taken into consideration; therefore, for example, in the case where the terminal voltages of the storage batteries are uniformly adjusted when the batteries are fully charged, if the largely deteriorated storage battery has reached a discharge lower limit when the batteries are discharged, the other storage batteries cannot continue to discharge, whereby a dischargeable effective capacity as an assembled battery decreases in some cases.

In view of the above, an object of the present invention is to provide an equalizing apparatus which can prevent or reduce the decrease in the dischargeable effective capacity as an assembled battery.

An equalizing apparatus according to the present invention includes: a voltage detector which detects a terminal voltage of each of a plurality of series connected storage batteries; a state estimator which estimates a degree of deterioration of each of the storage batteries; an equalizing unit which discharges a specified storage battery in the storage batteries; and a controller. The controller takes as a standard storage battery one of the storage batteries which has the lowest terminal voltage among the storage batteries, and the controller specifies the storage battery, which is to be discharged by the equalizing unit, in the storage batteries based on a magnitude relation between the degree of deterioration of each of the storage batteries and the degree of deterioration of the standard storage battery and based on a voltage difference between the terminal voltage of each of the storage batteries and the terminal voltage of the standard storage battery.

The present invention can provide an equalizing apparatus which can prevent or reduce the decrease in a dischargeable effective capacity as an assembled battery.

DESCRIPTION OF EMBODIMENTS

Figure 1:
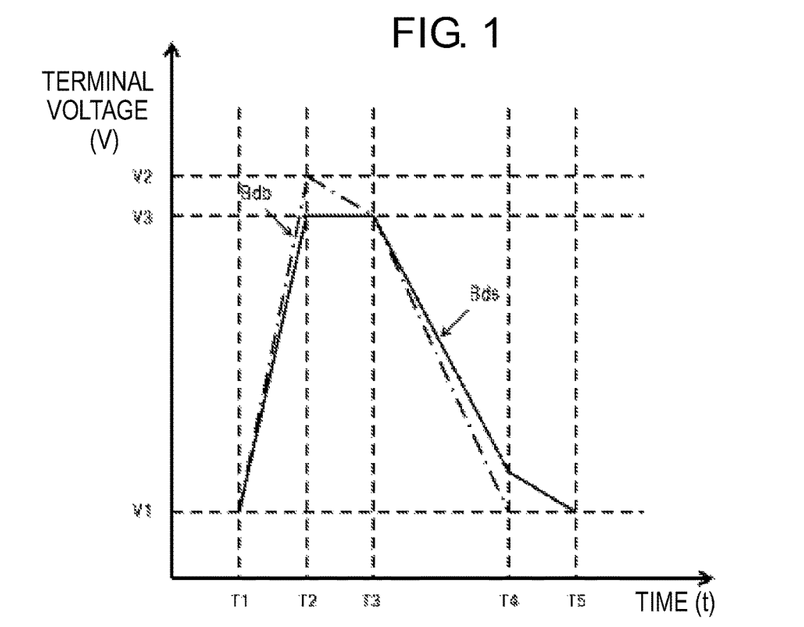
FIG. 1 is a diagram for illustrating a charge and discharge operation when a conventional equalizing process is performed.
Figure 2:
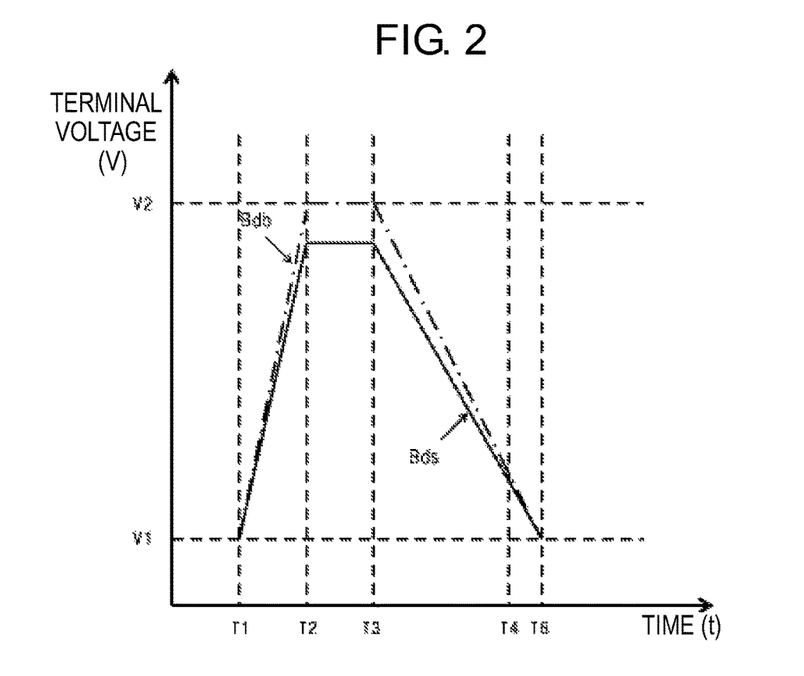
FIG. 2 is a diagram for illustrating a charge and discharge operation when an equalizing process according to an exemplary embodiment of the present invention is performed.

Prior to specifically describing exemplary embodiments of the present invention, a general description will be made with reference to FIGS. 1 and 2. FIG. 1 is a diagram for illustrating a charge and discharge operation when a conventional equalizing process is performed. For the convenience of description, it is assumed that an assembled battery includes series connected storage battery Bdb and storage battery Bds and that a degree of deterioration of storage battery Bdb is greater than a degree of deterioration of storage battery Bds.

In the charge and discharge operation shown in FIG. 1, charge of the whole of assembled battery starts at time T1, and a terminal voltage of storage battery Bdb reaches an upper limit charge voltage V2 at time T2; therefore, the charge of the whole of assembled battery ends. Next, equalizing discharge of storage battery Bdb starts at time T2, and the terminal voltages of storage battery Bdb and storage battery Bds become equal at time T3; therefore, the equalizing discharge of storage battery Bdb ends. Further, discharge of the whole of the assembled battery starts at time T3, and the terminal voltage of storage battery Bdb reaches a lower limit discharge voltage V1 at time T4; therefore, the discharge of the whole of the assembled battery ends. Then, the equalizing discharge of storage battery Bds starts at time T4, and the terminal voltages of storage battery Bds and storage battery Bdb become equal at time T5; therefore, the equalizing discharge of storage battery Bds ends.

A storage battery in a higher degree of deterioration has a higher polarization voltage due to an internal resistance. Therefore, as shown in FIG. 1, if discharge starts from a fixed terminal voltage at the time of discharge, storage battery Bdb, which is in a higher degree of deterioration, reaches the lower limit discharge voltage V1 sooner. In a similar way, at the time of charge, storage battery Bdb, which is in a higher degree of deterioration, reaches the upper limit charge voltage V2 sooner. On the other hand, storage battery Bds, which is in the lower degree of deterioration, does not reach the upper limit charge voltage V2 even at the time when the charge ends, and does not reach the lower limit discharge voltage V1 even at the time when the discharge ends. In other words, it can also be said that, if the terminal voltage of storage battery Bdb, which is in a higher degree of deterioration, is discharged for equalization at the time of completion of the charge so that the terminal voltage becomes equal to the terminal voltage of storage battery Bds, which is in the lower degree of deterioration, storage battery Bds cannot be discharged to the lower limit discharge voltage V1, and thus a dischargeable effective capacity decreases as the whole of the assembled battery.

In view of the above, in an exemplary embodiment of the present invention, a storage battery to be discharged is specified with reference to also a degree of deterioration in addition to a voltage difference between the terminal voltages. FIG. 2 is a diagram for illustrating a charge and discharge operation when an equalizing process according to the exemplary embodiment of the present invention is performed. Compared with FIG. 1, in the charge and discharge operation shown in FIG. 2, since storage battery Bdb is in a higher degree of deterioration than storage battery Bds, the equalizing discharge of storage battery Bdb from time T2 is not performed. Therefore, at time T3, at which discharge of the whole of the assembled battery is to be started, the terminal voltage of storage battery Bdb is still the upper limit charge voltage V2. Thus, if the discharge of the whole of the assembled battery starts at time T3, storage battery Bdb reaches the lower limit discharge voltage V1 at time T6; therefore, the discharge of the whole of the assembled battery ends at time T6. Since storage battery Bds can be discharged until time T6, which is after time T4, it is possible to control the decrease in the dischargeable effective capacity as the whole assembled battery.

In the following, an example of the exemplary embodiment of the present invention will be specifically described with reference to the drawings. In the reference drawings, the same parts are assigned the same reference marks, and the same parts will not be described again in principle.

First Exemplary Embodiment

Figure 3:
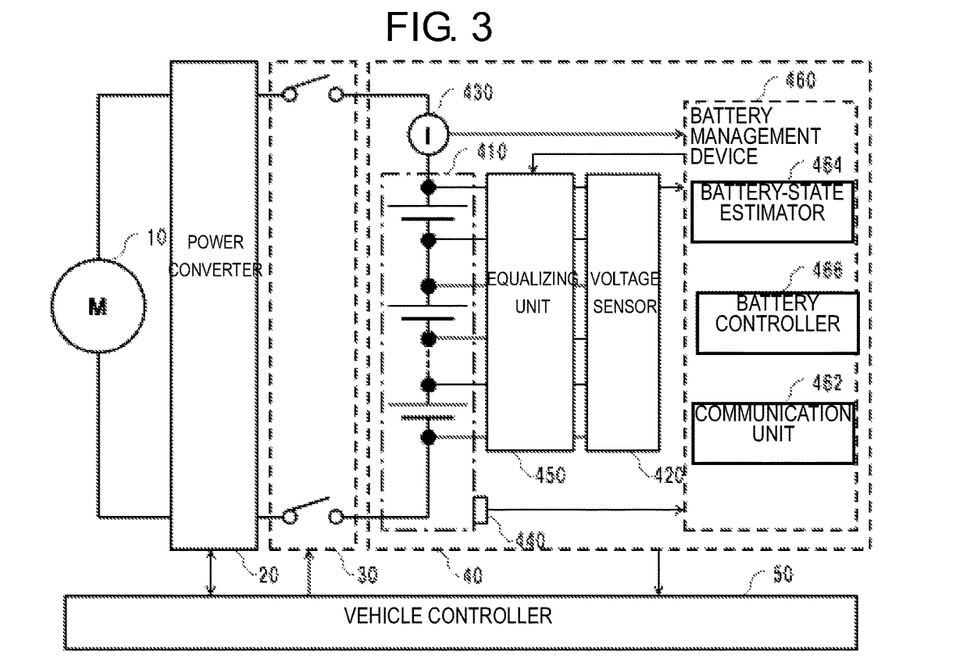
FIG. 3 is a diagram for illustrating a storage battery system according to a first exemplary embodiment of the present invention.

FIG. 3 is a diagram for illustrating storage battery system 40 according to the first exemplary embodiment of the present invention. In the first exemplary embodiment, storage battery system 40 is assumed to be installed in a vehicle as a source of power for an HEV (Hybrid Electric Vehicle), a PHEV (Plug-in Hybrid Electric Vehicle), an EV (Electric Vehicle), and the like.

Running motor 10 is, for example, a three-phase AC synchronous motor. Power converter 20 is coupled to storage battery system 40 through relay 30. Power converter 20 converts, at the time of power running, DC power supplied from storage battery system 40 into an alternating current, and supplies the alternating current to running motor 10. Further, at the time of regeneration, power converter 20 converts AC power supplied from running motor 10 into DC power, and supplies the DC power to storage battery system 40.

Relay 30 is controlled to be in an open state or a closed state by a relay control signal from vehicle controller 50. In the closed state, relay 30 connects power converter 20 to storage battery system 40 to form a charging and discharging path. Further, in the open state, relay 30 breaks the charging and discharging path between power converter 20 and storage battery system 40.

Vehicle controller 50 electronically controls the whole of the vehicle. Vehicle controller 50 sets a value of required torque value to be output to running motor 10 based on an amount of user's operation of an accelerator, a vehicle speed, information from the storage battery system, or the like. Vehicle controller 50 controls power converter 20 so that running motor 10 operates according to the value of required torque. For example, if stepping on an accelerator pedal makes the value of the required torque positive, vehicle controller 50 controls power converter 20 so that the electric power corresponding to the value of required torque is supplied to running motor 10. Further, if stepping on the brake pedal makes the value of required torque negative, vehicle controller 50 controls power converter 20 so that electric power generated by running motor 10 using deceleration energy as an energy source is supplied to storage battery system 40.

Storage battery system 40 includes battery module 410, voltage sensor 420, current sensor 430, temperature sensor 440, equalizing unit 450, and battery management device 460.

Battery module 410 includes two or more storage batteries. The storage batteries included in the battery module 410 are, for example, lithium-ion batteries or nickel-hydrogen batteries. With reference to FIG. 3, a plurality of series connected storage batteries B1 to Bn (n is an integer, and hereinafter Bj represents the j-th storage battery, where j is an integer from 1 to n) constitute battery module 410; however, a number of storage batteries constituting battery module 410 may be two. A part of the storage batteries included in battery module 410 may be parallel connected to each other. Note that, in the first exemplary embodiment, the storage battery refers to a single battery unless otherwise indicated.

Battery module 410 is coupled to power converter 20 through relay 30. Battery module 410 can be supplied with charging electric power through power converter 20 when running motor 10 is operating as a source of electric power (at the time of regeneration). Further, battery module 410 can supply discharging electric power through power converter 20 when running motor 10 is operating as a load (at the time of power running).

Voltage sensor 420 detects a value of a voltage Vd, which is a terminal voltage of each of storage batteries B1 to Bn constituting battery module 410 (the terminal voltage is a potential difference between a positive electrode and a negative electrode of each of storage batteries B1 to Bn). Voltage sensor 420 outputs the values of the detected voltages Vd (hereinafter, Vdj represents the voltage Vd of storage battery Bj) of the storage batteries to battery management device 460.

Current sensor 430 is disposed between battery module 410 and power converter 20 so as to measure a value of a current Id flowing through battery module 410. Current sensor 430 outputs the detected value of the current Id to battery management device 460.

Temperature sensor 440 detects a value of a temperature Td of battery module 410 (for example, a surface temperature of battery module 410). Battery module 410 outputs the detected value of the temperature Td to battery management device 460.

Equalizing unit 450 performs an equalizing process by discharging the storage battery specified by battery controller 466 so that the terminal voltage of each of the plurality of storage batteries B1 to Bn constituting battery module 410 becomes closer to the same voltage. Note that it can be thought that the equalizing apparatus having voltage sensor 420, equalizing unit 450, battery-state estimator 464, and battery controller 466 is included in storage battery system 40 according to the first exemplary embodiment of the present invention.

Figure 4:
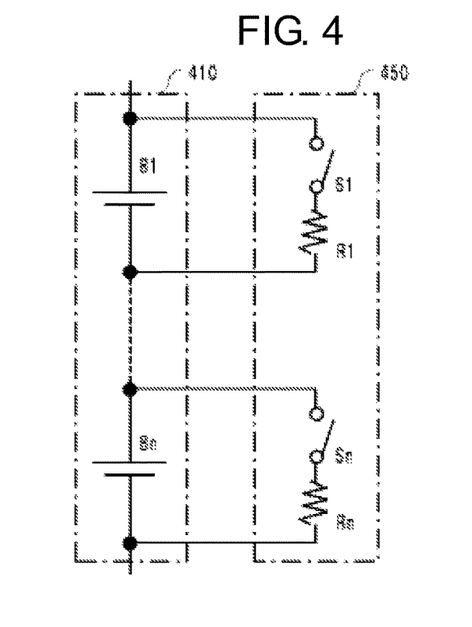
FIG. 4 is a diagram showing a configuration example of the equalizing unit according to the first exemplary embodiment of the present invention.

FIG. 4 is a diagram showing a configuration example of equalizing unit 450 according to the first exemplary embodiment of the present invention. As shown in FIG. 4, equalizing unit 450 has equalizing circuits each of which is parallel connected to each of storage batteries Bj. Each of the equalizing circuits includes series connected switching device Sj and resistive element Rj. As switching device Sj, it is possible to use, for example, an n-type MOS FET (Metal-Oxide-Semiconductor Field-Effect Transistor), which is a type of semiconductor switch. Instead of an n-type MOS FET, it is possible to use an IGBT (Insulated Gate Bipolar Transistor), a GaN transistor, an SiC transistor, and the like. Switching device Sj turns on and off in response to a control signal from battery controller 466. Equalizing unit 450 turns on switching device Sj to perform an equalizing process of storage battery Bj by discharging storage battery Bj through resistive element Rj.

FIG. 3 is again referred to. Battery management device 460 includes communication unit 462, battery-state estimator 464, and battery controller 466. Communication unit 462 transmits to vehicle controller 50 information about a battery state such as an SOC estimated by battery-state estimator 464. Battery management device 460 and vehicle controller 50 are connected to each other through a network such as the CAN (Controller Area Network).

By using battery-state data including the current Id, the voltage Vd, and the temperature Td, battery-state estimator 464 estimates, a battery state such as: an SOC (State Of Charge), which is an index representing a state of charge (also referred to as a "charge rate") of battery module 410; an SOH (State Of Health), which is an index representing a degree of deterioration; and an allowable charge and discharge electric power.

Battery-state estimator 464, for example, integrates the current Id received from current sensor 430, and estimates the SOC based on the integrated current. Further, battery-state estimator 464 estimates, using the following equations (1) and (2), the SOH of storage batteries B1 to Bn (hereinafter, SOHj represents the SOH of storage battery Bj) based on a variation amount of the estimated SOC and a current integration value for a time period required for the variation.

$$SOH=(FCC/Ci)\times100 \quad (1)$$

$$FCC=(Qt/\Delta SOC)\times100 \quad (2)$$

In the equations, FCC (Full Charge Capacity) is a full charge capacity of the storage battery, Ci is an initial capacity (design capacity) of the storage battery, ΔSOC is a variation value of the SOC, and Qt is an interval capacity (current integration value) required for ΔSOC. Specifically, SOH is defined by a ratio of the full charge capacity FCC to the initial capacity Ci. Note that, as apparent from the definition of the SOH, if the degree of deterioration is higher, the SOH is lower. Battery-state estimator 464 outputs the estimated SOC and the like to communication unit 462 and battery controller 466.

Battery controller 466 controls the whole of the storage battery system. Further, battery controller 466 obtains the voltage as a standard based on the voltage Vdj of each of storage batteries B1 to Bn, and obtains the degree of deterioration as a standard based on the SOHj of each of storage batteries B1 to Bn. By comparing the obtained voltage and the obtained degree of deterioration with SOHj and the voltage Vdj, where SOHj is an index representing the degree of deterioration of each of storage batteries B1 to Bn, battery controller 466 specifies the storage battery, on which an equalizing process is to be performed, and controls equalizing unit 450 to perform an equalizing process on the specified storage battery.

For this purpose, battery controller 466 chooses storage battery Bs (hereinafter, also referred to as a "standard storage battery Bs") which has the lowest voltage, based on the voltage Vdj of each of storage batteries B1 to Bn received from voltage sensor 420. Battery controller 466 obtains the voltage Vdj of the standard storage battery Bs as a standard voltage Vs. Further, battery controller 466 obtains the SOHj of the standard storage battery Bs as the standard SOHs, from the SOHj of each of storage batteries B1 to Bn received from battery-state estimator 464.

Battery controller 466 compares the SOHj of each of storage batteries B1 to Bn with the standard SOHs. With respect to the storage battery whose SOHj is equal to or lower than the standard SOHs (such a storage battery is also referred to as a "first storage battery"), battery controller 466 determines that equalizing unit 450 does not need to discharge the first storage battery if the voltage Vdj of the first storage battery is equal to or higher than a threshold value related to a terminal voltage (also referred to as a "first threshold value"). On the other hand, with respect to the storage battery whose SOHj is greater than the standard SOHs (such a storage battery is referred to as a "second storage battery"), or with respect to a storage battery which is the first storage battery and whose voltage Vdj is lower than the first threshold value, battery controller 466 calculates a voltage difference ΔV between the voltage Vdj of each of such batteries and the standard voltage Vs (hereinafter, the voltage difference between the voltage Vdj of storage battery Bj and the standard voltage Vs is represented by ΔVj, which means ΔVj=Vdj−Vs). Then, if the voltage difference ΔVj is equal to or greater than a threshold value related to a voltage difference ΔV (also referred to as a "second threshold value"), battery controller 466 specifies storage battery Bj as the storage battery to be discharged by equalizing unit 450.

Battery controller 466 generates a control signal (that is, a signal for turning on switching device Sj) for causing equalizing unit 450 to discharge the specified storage battery Bj, and outputs the control signal to equalizing unit 450. Battery controller 466 starts an equalizing process, and then obtains the voltage Vdj of the specified storage battery Bj to update the voltage difference ΔVj at a predetermined cycle. At the time when the voltage difference ΔVj becomes smaller than the second threshold value, battery controller 466 determines that the variation between the voltage Vdj of the specified storage battery Bj and the standard voltage Vs is within an allowable range. Then, battery controller 466 generates a control signal (that is, a signal for turning off switching device Sj) for terminating the discharge by equalizing unit 450, and outputs the control signal to equalizing unit 450.

Note that, the above-described equalizing process may be performed when the charge has been completed, in other words, when one storage battery of storage batteries B1 to Bn constituting battery module 410 has reached the upper limit charge, or may be performed when the charge is being performed.

Figure 5:
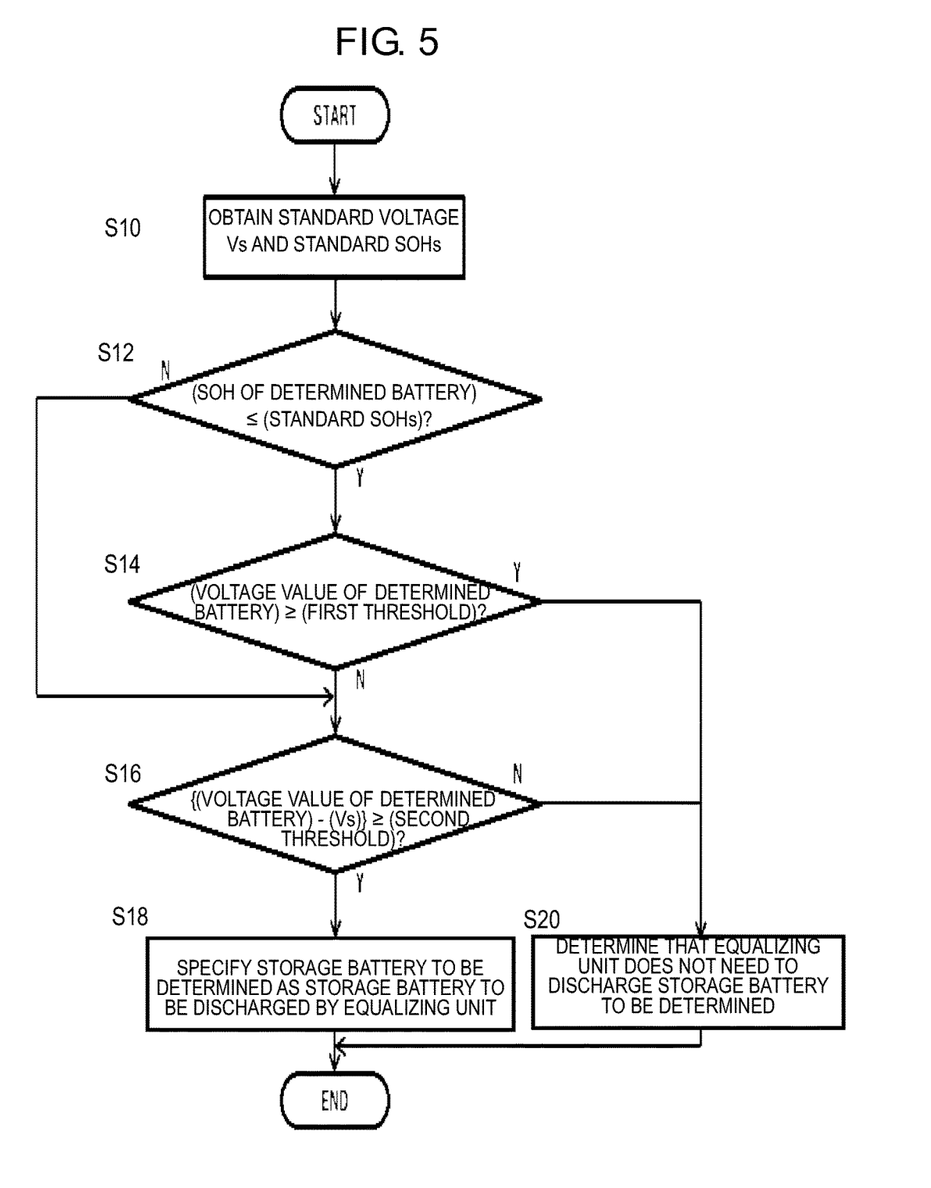
FIG. 5 is an operational flowchart related to how to determine an object on which the equalizing process of the first exemplary embodiment of the present invention is to be performed.

An operation of the equalizing apparatus having the above-described configuration will be described. FIG. 5 is an operational flowchart related to how to determine an object on which the equalizing process of the first exemplary embodiment of the present invention is to be performed. Battery controller 466 obtains the standard voltage Vs and the standard SOHs (step S10). Battery controller 466 chooses the storage battery as a determination object from storage batteries B1 to Bn, and compares the SOHj of the storage battery as a determination object with the standard SOHs (step S12). If the SOHj of the storage battery as a determination object is equal to or smaller than the standard SOHs, in other words, if the degree of deterioration of the storage battery as a determination object is equal to or greater than the degree of deterioration of the standard storage battery Bs (step S12: Y), battery controller 466 compares the voltage Vdj of the storage battery as a determination object with the first threshold value (step S14). If the voltage Vdj of the storage battery as a determination object is equal to or greater than the first threshold value (step S14: Y), battery controller 466 determines that an equalizing process does not need to be performed on the storage battery as a determination object (step S20). On the other hand, if the SOHj of the storage battery as a determination object is greater than the standard SOHs, in other words, if the degree of deterioration of the storage battery as a determination object is smaller than the degree of deterioration of the standard storage battery Bs (step S12: N), or if the voltage Vdj of the storage battery as a determination object is lower than the first threshold value (step S14: N), battery controller 466 compares the voltage difference ΔVj with the second threshold value (step S16). If the voltage difference ΔVj is equal to or greater than the second threshold value (step S16: Y), battery controller 466 specifies the storage battery as a determination object to be the storage battery on which an equalizing process is to be performed (step S18). If the voltage difference ΔVj is smaller than the second threshold value (step S16: N), battery controller 466 determines that an equalizing process does not need to be performed on the storage battery as a determination object (step S20). Battery controller 466 repeats the above-described process on all of the storage batteries in storage batteries B1 to Bn except the standard storage battery Bs so as to specify a storage battery to be discharged by equalizing unit 450.

With the first exemplary embodiment of the present invention, battery controller 466 specifies the storage battery to be discharged by equalizing unit 450 based on the magnitude relation between the SOHj of storage battery Bj and the standard SOHs of the standard storage battery Bs and based on the voltage difference between the terminal voltage of each of the storage batteries and the standard voltage Vs of the standard storage battery Bs, and battery controller 466 causes equalizing unit 450 to discharge the specified storage battery. Thus, it is possible to prevent or reduce the decrease in the dischargeable effective capacity as an assembled battery. With respect to the first storage battery, which is in a higher degree of deterioration than the standard storage battery Bs, battery controller 466 does not specify the first storage battery as the storage battery to be discharged by equalizing unit 450 if the voltage Vdj of the first storage battery is higher than the first threshold value. Thus, it is possible to prevent the deterioration of the storage battery from being accelerated by an equalizing process. With respect to the second storage battery, which is in a lower degree of deterioration than the standard storage battery Bs, or with respect to a storage battery which is the first storage battery and which has a terminal voltage lower than the first threshold value, battery controller 466 specifies the first storage battery or the second storage battery as the storage battery to be discharged by equalizing unit 450 if the voltage difference between the terminal voltage and the standard voltage Vs is greater than the second threshold value. Thus, it is possible to prevent the decrease in the dischargeable effective capacity and acceleration of deterioration as an assembled battery, and at the same time, it is possible to control the variation on the terminal voltage between the storage batteries.

Second Exemplary Embodiment

A second exemplary embodiment will be described. An equalizing apparatus according to the second exemplary embodiment has the same configuration and operation as those in the equalizing apparatus according to the first exemplary embodiment except adjusting the variation of the SOC between the storage batteries and except the following description associated with the adjusting of the variation.

Equalizing unit 450 performs an equalizing process by discharging the storage battery specified by battery controller 466 so that the SOC of each of storage batteries B1 to Bn constituting battery module 410 becomes closer to the same value.

Battery controller 466 chooses the standard storage battery Bs having the smallest SOC based on the SOC of each of storage batteries B1 to Bn received from battery-state estimator 464 (hereinafter, SOCj represents the SOC of storage battery Bj). Battery controller 466 obtains the SOCj of the standard storage battery Bs as a standard SOCs.

Battery controller 466 determines that equalizing unit 450 does not need to discharge the first storage battery if the SOCj of the first storage battery is equal to or greater than a threshold value related to an SOC (also referred to as a "third threshold value"). On the other hand, with respect to the second storage battery or a storage battery which is the first storage battery and whose SOCj is smaller than the third threshold value, battery controller 466 calculates a charge rate difference ΔSOC between the SOCj of each of such batteries and the standard SOCs (hereinafter, the charge rate difference between the SOCj of storage battery Bj and the standard SOCs is represented by ΔSOCj, which means ΔSOCj=SOCj−SOCs). Then, if the charge rate difference ΔSOCj is equal to or greater than the threshold value related to a charge rate difference ΔSOC (also referred to as a "fourth threshold value"), battery controller 466 specifies storage battery Bj as the storage battery to be discharged by equalizing unit 450.

Battery controller 466 starts an equalizing process and then obtains the SOCj of the specified storage battery Bj to update the voltage difference ΔSOCj at a predetermined cycle. At the time when the charge rate difference ΔSOCj becomes smaller than the fourth threshold value, battery controller 466 determines that the variation between the SOCj of the specified storage battery Bj and the standard SOCs is within an allowable range. Then, battery controller 466 generates a control signal for terminating the discharge by equalizing unit 450, and outputs the control signal to equalizing unit 450.

Figure 6:
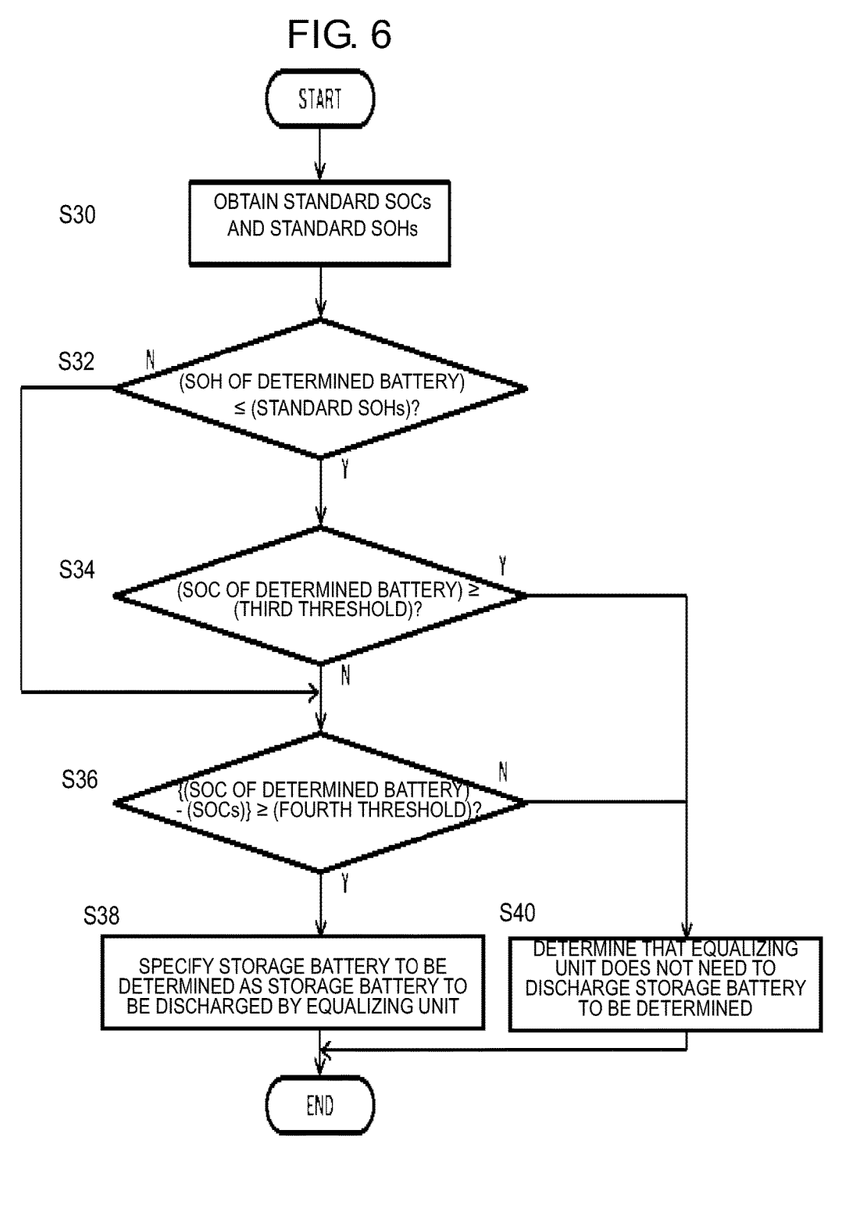
FIG. 6 is an operational flowchart related to how to determine an object on which an equalizing process of a second exemplary embodiment of the present invention is to be performed.

An operation of the equalizing apparatus having the above-described configuration will be described. FIG. 6 is an operational flowchart related to how to determine an object on which the equalizing process of the second exemplary embodiment of the present invention is to be performed. Battery controller 466 obtains the standard SOCs and the standard SOHs (step S30). Battery controller 466 chooses the storage battery as a determination object from storage batteries B1 to Bn, and compares the SOHj of the storage battery as a determination object with the standard SOHs (step S32). If the SOHj of the storage battery as a determination object is equal to or smaller than the standard SOHs, in other words, if the degree of deterioration of the storage battery as a determination object is equal to or greater than the degree of deterioration of the standard storage battery Bs (step S32: Y), battery controller 466 compares the SOCj of the storage battery as a determination object with the third threshold value (step S34). If the SOCj of the storage battery as a determination object is equal to or greater than the third threshold value (step S34: Y), battery controller 466 determines that an equalizing process does not need to be performed on the storage battery as a determination object (step S40). On the other hand, if the SOHj of the storage battery as a determination object is greater than the standard SOHs, in other words, the degree of deterioration of the storage battery as a determination object is lower than the standard storage battery Bs (step S32: N), or if the SOCj of the storage battery as a determination object is smaller than the third threshold value (step S34: N), battery controller 466 compares the charge rate difference $\Delta SOCj$ with the fourth threshold value (step S36). If the charge rate difference $\Delta SOCj$ is equal to or greater than the fourth threshold value (step S36: Y), battery controller 466 specifies the storage battery as a determination object as the storage battery on which an equalizing process is to be performed (step S38). If the charge rate difference $\Delta SOCj$ is smaller than the fourth threshold value (step S36: N), battery controller 466 determines that an equalizing process does not need to be performed on the storage battery as a determination object (step S40). Battery controller 466 repeats the above-described process on all of the storage batteries in storage batteries B1 to Bn except the standard storage battery Bs so as to specify the storage battery to be discharged by equalizing unit 450.

With the second exemplary embodiment of the present invention, battery controller 466 specifies the storage battery to be discharged by equalizing unit 450 based on the magnitude relation between the SOHj of storage battery Bj and the standard SOHs of the standard storage battery Bs and based on the charge rate difference between the SOCj of storage battery Bj and the standard SOCs of the standard storage battery Bs, and battery controller 466 causes equalizing unit 450 to discharge the specified storage battery. Thus, it is possible to prevent or reduce the decrease in the dischargeable effective capacity as an assembled battery. If the SOCj of the first storage battery is greater than third threshold value, battery controller 466 does not specify the first storage battery to be the storage battery to be discharged by equalizing unit 450. Thus, it is possible to prevent the deterioration of the storage battery from being accelerated by an equalizing process. With respect to the second storage battery, which is in a lower degree of deterioration than the standard storage battery Bs, or with respect to a storage battery which is the first storage battery and which has the SOC smaller than the third threshold value, battery controller 466 specifies the second storage battery or the first storage battery as the storage battery to be discharged by equalizing unit 450, if the charge rate difference between the SOC and the standard SOCs is greater than the fourth threshold value. Thus, it is possible to prevent the decrease in the dischargeable effective capacity and acceleration of deterioration as an assembled battery, and at the same time, it is possible to control the variation of the SOC between the storage batteries.

The present invention is described above based on the exemplary embodiments. These exemplary embodiments are shown just as examples, and it is understood by a person skilled in the art that various modified examples may be made according to the combination of the components and the processes in the present embodiments and that those modified examples are in the scope of the present invention.

For example, in the exemplary embodiments of the present invention, it is described that the first storage battery, which is in a higher degree of deterioration than the standard storage battery Bs, is not specified as the storage battery to be discharged by equalizing unit 450, if the voltage Vdj of the first storage battery is equal to or higher than the first threshold value, or if the SOCj of the first storage battery is equal to or greater than the third threshold value. In this exemplary embodiment, the first threshold value or the third threshold value may be changed depending on the magnitude of the SOHj of the first storage battery. Further, if the SOHj of the first storage battery is equal to or smaller than a threshold value related to an SOH (also referred to as a "fifth threshold value"), the first storage battery does not need to be specified as the storage battery to be discharged by equalizing unit 450. With the modified example, it is possible to adaptively prevent the decrease in the dischargeable effective capacity as an assembled battery and acceleration of deterioration, and at the same time, it is possible to control the variation of the terminal voltage or the SOC between the storage batteries.

Further, in the exemplary embodiments of the present invention, it is described that equalizing unit 450 performs an equalizing process by discharging the storage battery specified by battery controller 466. However, equalizing unit 450 may perform an equalizing process by transferring electric charge from one of the two storage batteries specified by battery controller 466 to the other storage battery.

Specifically, equalizing unit 450 has a transfer circuit for transferring electric charge between any two storage batteries in storage batteries B1 to Bn. As the transfer circuit, it is possible to use a known transfer circuit constituted by, for example, an inductive element and a switching device.

As preparation for the equalizing process of storage batteries B1 to Bn, battery controller 466 divides, storage batteries B1 to Bn into a group of the storage batteries from which electric charge is to be discharged (also referred to as a "discharge group") and into a group of storage batteries to which electric charge is to be charged (also referred to as a "charge group"). For example, battery controller 466 obtains an average voltage by averaging the voltages Vdj of storage batteries B1 to Bn. Battery controller 466 puts storage battery Bj in the discharge group as a third storage battery if the voltage Vdj of storage battery Bj is equal to or higher than the average voltage, and battery controller 466 puts storage battery Bj in the charge group as a fourth storage battery if the voltage Vdj of storage battery Bj is lower than the average voltage. When battery controller 466 specifies one fourth storage battery as the standard storage battery Bs, battery controller 466 chooses (i) one third storage battery whose SOHj is greater than the standard SOHs or (ii) one third storage battery whose SOHj is smaller than the standard SOHs and whose voltage Vdj is lower than the first threshold value. If only one third storage battery is chosen, battery controller 466 simply specifies the only one third storage battery. If a plurality of third storage batteries are chosen, battery controller 466 specifies one of the third storage batteries in such a manner that the voltage Vdj of the one of the third storage batteries and the fourth storage battery becomes closer to the average voltage when electric charge is transferred from the one of the third storage batteries to the fourth storage battery through the transfer circuit. Battery controller 466 repeats the above-described process to create combinations each of which is made up of one of the third storage batteries and one the fourth storage battery between which electric charge is transferred.

In each of the created combinations, battery controller 466 controls equalizing unit 450 in such a manner that electric charge is transferred from the specified third storage battery to the specified fourth storage battery through the transfer circuit. With the modified examples, since electric charge is transferred to equalize the variation between the storage batteries, it is possible to further control the decrease in the dischargeable effective capacity as an assembled battery.

Note that the invention according to the present exemplary embodiments may also be specified by the items described below.

[Item 1]

An equalizing apparatus includes: a voltage detector which detects a terminal voltage of each of a plurality of series connected storage batteries; a state estimator which estimates a degree of deterioration of each of the plurality of storage batteries; an equalizing unit which discharges a specified storage battery in the plurality of storage batteries; and a controller which obtains a standard voltage based on the terminal voltages of the plurality of storage batteries, which obtains a standard degree of deterioration based on a plurality of the degrees of deterioration, and which specifies, from the plurality of storage batteries, a storage battery to be discharged by the equalizing unit, based on a magnitude relation between the degree of deterioration of each of the storage batteries and the standard degree of deterioration and based on a voltage difference between the terminal voltage of each of the storage batteries and the standard voltage.

[Item 2]

In the equalizing apparatus of Item 1, the controller takes, as a standard storage battery, one of the storage batteries which has a lowest terminal voltage in the terminal voltages of the plurality of storage batteries, the controller obtains, as the standard voltage, the terminal voltage of the standard storage battery, and the controller obtains, as the standard degree of deterioration, the degree of deterioration of the standard storage battery.

[Item 3]

In the equalizing apparatus of Item 2, with respect to a first storage battery which is in a higher degree of deterioration than the standard storage battery, when the terminal voltage of the first storage battery is equal to or higher than a first threshold value related to the terminal voltage, the controller does not specify the first storage battery as the storage battery to be discharged by the equalizing unit.

[Item 4]

In the equalizing apparatus of Item 3, when a voltage difference between (i) the terminal voltage of a second storage battery which is in a lower degree of deterioration than the standard storage battery and (ii) the terminal voltage of the standard storage battery is equal to or higher than a second threshold value related to the voltage difference, the controller specifies the second storage battery as the storage battery to be discharged by the equalizing unit; and when a voltage difference between (i) the terminal voltage of the first storage battery which has a terminal voltage lower than the first threshold value and (ii) the terminal voltage of the standard storage battery is equal to or higher than the second threshold value, the controller specifies the first storage battery as the storage battery to be discharged by the equalizing unit.

An equalizing apparatus according to the present invention is useful for a backup power source, an electric vehicle, and the like as a storage battery system having an equalizing process function.

The invention claimed is:

1. An equalizing apparatus comprising:
a voltage detector which detects a terminal voltage of each of a plurality of series connected storage batteries;
a state estimator which estimates a degree of deterioration of each of the plurality of storage batteries;
an equalizing unit which discharges a specified storage battery in the plurality of storage batteries; and
a controller which specifies, from the plurality of storage batteries, a storage battery to be discharged by the equalizing unit, based on the estimated degree of deterioration of each of the storage batteries,
wherein the state estimator estimates a state of health (SOH) of each of the plurality of storage battery, as the degree of deterioration, and the SOH is defined by a ratio of a full charge capacity to an initial capacity.

2. The equalizing apparatus according to claim 1, wherein the state estimator estimates the SOH by using the following equation (1):

$$SOH = (FCC/Ci) \times 100 \quad (1),$$

where FCC is the full charge capacity of a given storage battery, and Ci is the initial capacity of the given storage battery.

3. The equalizing apparatus according to claim 2, wherein the FCC is given by the following equation (2):

$$FCC = (Qt/\Delta SOC) \times 100 \quad (2),$$

where $\Delta SOC$ is a variation value of a state of charge (SOC) of the given storage battery, and Qt is an interval capacity required for $\Delta SOC$.

4. The equalizing apparatus according to claim 3, wherein the state estimator estimates the $\Delta SOC$ based on an integrated current.

5. The equalizing apparatus according to claim 3, wherein:
the controller selects, from the plurality of storage batteries, a standard storage battery to be compared with remaining ones of the plurality of storage batteries, obtains a terminal voltage of the standard storage battery, as a standard voltage, and obtains the SOH of the standard storage battery, as a standard degree of deterioration, and
the controller specifies, from the plurality of storage batteries, the storage battery to be discharged by the equalizing unit, based on a magnitude relation between the degree of deterioration of each of the storage batteries and the standard degree of deterioration and based on a voltage difference between the terminal voltage of each of the storage batteries and the standard voltage.

6. The equalizing apparatus according to claim 5, wherein the controller selects, as the standard storage battery, one of the plurality of storage batteries which has a lowest terminal voltage among the plurality of storage batteries.

7. The equalizing apparatus according to claim 6, wherein with respect to a first storage battery which is in a higher degree of deterioration than the standard storage battery, when the terminal voltage of the first storage battery is equal to or higher than a first threshold value related to the terminal voltage, the controller does not specify the first storage battery as the storage battery to be discharged by the equalizing unit.

8. The equalizing apparatus according to claim 7, wherein:
   when a voltage difference between (i) the terminal voltage of a second storage battery which is in a lower degree of deterioration than the standard storage battery and (ii) the terminal voltage of the standard storage battery is equal to or higher than a second threshold value related to the voltage difference, the controller specifies the second storage battery as the storage battery to be discharged by the equalizing unit, and
   when a voltage difference between (i) the terminal voltage of the first storage battery which has a terminal voltage lower than the first threshold value and (ii) the terminal voltage of the standard storage battery is equal to or higher than the second threshold value, the controller specifies the first storage battery as the storage battery to be discharged by the equalizing unit.

* * * * *